UNITED STATES PATENT OFFICE.

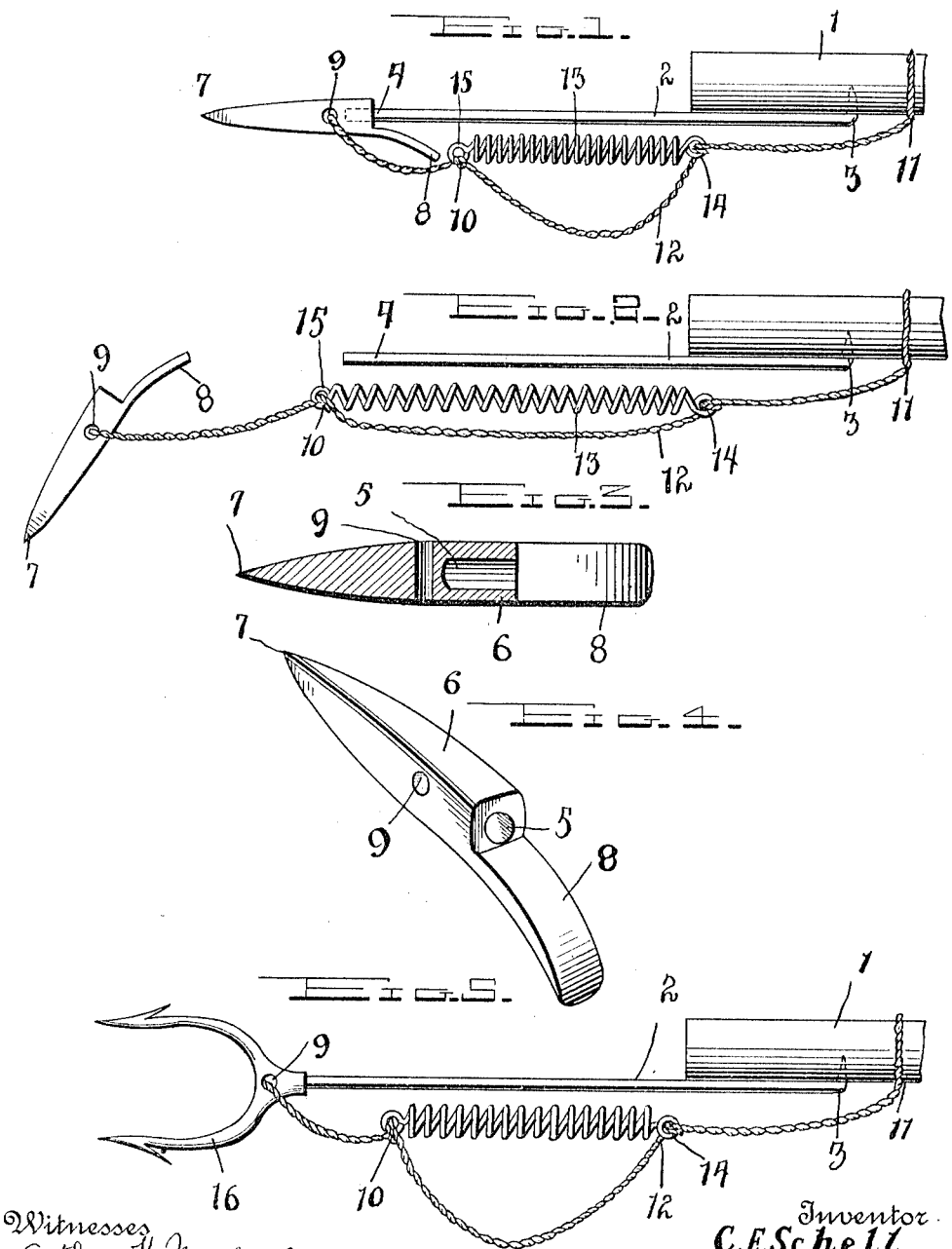

CHARLES E. SCHELL, OF KNIGHTS FERRY, CALIFORNIA.

FISH-SPEAR.

1,072,172.　　　　　Specification of Letters Patent.　　Patented Sept. 2, 1913.

Application filed March 15, 1913. Serial No. 754,429.

*To all whom it may concern:*

Be it known that I, CHARLES E. SCHELL, a citizen of the United States, residing at Knights Ferry, in the county of Stanislaus, State of California, have invented certain new and useful Improvements in Fish-Spears; and I do hereby declare the following to be a full, clear, and exact description of the invention, such as will enable others skilled in the art to which it appertains to make and use the same.

The present invention relates to certain novel and useful improvements in fish spears.

In carrying out my invention it is my purpose to provide a simple form of fish spear, embracing, among other features, a pointed head provided with an outwardly curved or flaring fluke or wing, the construction being such that when the fish is struck and penetrated by the pointed head of the spear, the fluke will have a tendency to turn or guide the head in a crosswise direction in the body of the fish so that such head cannot be withdrawn, except by the exercise of considerable force and strength and the consequent tearing of the flesh. At the same time the manner in which the head is detachably connected with the rod or shank of the spear permits the head to come off the rod when the head is embedded in the body of the fish. Furthermore, in my improved spear, I provide a flexible connection between the detachable head and the pole of the spear, this flexible connection being provided with a resilient member, such as a spring which takes up any slack in connection with and normally holds the head positioned on the rod, this connection, however, permitting the detachment of the head from the rod when the fish is struck.

With the above recited objects and others of a similar nature in view, my invention consists in the construction, combination and arrangement of parts set forth in and falling within the scope of the appended claim.

In the drawings: Figure 1 is a view in side elevation of a fish spear embodying my invention, showing the position of the parts when the implement is ready for casting. Fig. 2 is a similar view showing the position the parts assume when a strike has been made. Fig. 3 is a longitudinal sectional view taken through the head on line 2—2 of Fig. 1. Fig. 4 is a detail perspective view of the head. Fig. 5 is a detail view in elevation of a modified form of spear head.

Referring now to the accompanying drawings in detail, the numeral 1 designates the pole or handle of the spear, which may be of any suitable dimensions, and formed of any suitable material.

The numeral 2 designates the shank or rod of the spear, which at one end is provided with a laterally extending pointed head 3 adapted to be embedded in the adjacent end portion of the pole 1. The opposite end 4 of this rod 2 fits loosely within the socket 5 bored in the butt end of the spear head 6, this head terminating at its opposite end in the usual spear point 7. Formed at the butt end of the head and to one side of the socket is an outwardly flared or curved fluke or wing 8, which, when the head strikes the fish, is adapted in the penetration of such head to turn the latter to one side so that the spear head will be embedded in a crosswise direction in the body of the fish. This turning of the head in the body of the fish is caused by reason of the fact that as the fluke or wing is curved outwardly beyond the adjacent side of the spear head it acts as a tail or guide, and as such fluke or wing enters the body of the fish it naturally turns the head from a direct, straight course. Extending through the head is a transverse bore 9, through which is designed to pass a line or rope, or other flexible connection indicated at 10, this rope being suitably secured as at 11 to the pole 1. This flexible connection is sufficiently long to provide for a certain amount of slack in the rope as is shown at 12, and when it is desired to hold the head connected with the rod 2, this slack is taken up by means of a coil spring or other tension means 13, one end of the spring being connected to the rope at 14, while the opposite end is connected thereto at 15. It will be understood that in this connection any resilient means may be used for this purpose other than the spring.

The above briefly describes the construction of my device, and the operation will be readily apparent to those skilled in the art.

When the spear is ready for casting the head is mounted on the end of the rod and held in position thereon by means of a flexible connection 12 and its resilient spring which takes up any slack in such connection. When the cast has been made and the head has penetrated the body of the fish and is firmly embedded therein, the pull or strain upon the pole in a direction away from the head will draw out or lengthen the spring so that the rod will be pulled or drawn from the socket in the spear head, although it will be noted that the spear head will still be connected with the pole or handle through the medium of the cord 12. Thus a flexible or yielding connection is provided between the head and the pole so that the rapid and various movements of the fish will not have a tendency to loosen and tear the head out of the body, and at the same time the spring or resilient connection will take up any undue strain which might be placed upon the rod connecting the head with the pole.

In Fig. 4 I have shown a slightly modified form of my invention, in this case, a double spear head as shown at 16 being employed in the place of a single spear head shown in Figs. 1 to 3 inclusive, and in case of the modification, the operation is precisely the same as that described for the single spear head.

It will be seen that I have provided an exceedingly simple, yet efficient form of spear, and one which may be manufactured and marketed at a relatively low cost.

While I have herein shown and described one particular embodiment of my invention, I wish it to be understood that I do not confine myself to all the precise details of construction herein set forth by way of illustration, as modification and variation may be made without departing from the spirit of the invention or exceeding the scope of the appended claim.

What I claim is:

In an implement of the class described, the combination with a pole, of a member rigidly connected therewith, a spear head detachably connected with said member, a flexible connection between the spear head and the pole, and a resilient member for taking up slack in the flexible connection.

In testimony whereof, I affix my signature, in the presence of two witnesses.

CHARLES E. SCHELL.

Witnesses:
E. M. ENDICOTT,
W. T. WATSON.

---

Copies of this patent may be obtained for five cents each, by addressing the "Commissioner of Patents, Washington, D. C."